United States Patent
Koebsch et al.

(10) Patent No.: US 11,590,524 B2
(45) Date of Patent: Feb. 28, 2023

(54) CABLE ROBOT FOR COATING PROCEDURES

(71) Applicants: PETROLEO BRASILEIRO S.A.—PETROBRAS, Rio de Janeiro (BR); SERVICO NACIONAL DE APRENDIZAGEM INDUSTRIAL—DEPARTAMENTO REGIONAL DE SANTA CATARINA, Florianopolis (BR)

(72) Inventors: Andre Koebsch, Rio de Janeiro (BR); Andre Marcon Zanatta, Joinville (BR); Ariel Paulo Rezende, Joinville (BR); Ismael Jose Secco, Joinville (BR); Walter Kapp, Curitiba (BR)

(73) Assignees: PETROLEO BRASILEIRO S.A.—PETROBRAS, Rio de Janeiro (BR); SERVICO NACIONAL DE APRENDIZAGEM INDUSTRIAL—DEPARTAMENTO REGIONAL DE SANTA CATARINA, Florianopolis (BR)

( * ) Notice: Subject to any disclaimer, the term of this patent is extended or adjusted under 35 U.S.C. 154(b) by 0 days.

(21) Appl. No.: 17/418,566

(22) PCT Filed: Dec. 26, 2019

(86) PCT No.: PCT/BR2019/050565
§ 371 (c)(1),
(2) Date: Jun. 25, 2021

(87) PCT Pub. No.: WO2020/132734
PCT Pub. Date: Jul. 2, 2020

(65) Prior Publication Data
US 2022/0072575 A1     Mar. 10, 2022

(30) Foreign Application Priority Data

Dec. 28, 2018   (BR) .................... 102018077363-1

(51) Int. Cl.
*B05B 13/04*      (2006.01)
*B05B 15/60*      (2018.01)
(Continued)

(52) U.S. Cl.
CPC ...... *B05B 13/0431* (2013.01); *B05B 13/0426* (2013.01); *B05B 15/60* (2018.02); *B25J 5/02* (2013.01); *B25J 11/0075* (2013.01)

(58) Field of Classification Search
USPC ................ 118/321, 323; 414/735; 901/29; 74/490.04, 490.06
See application file for complete search history.

(56) References Cited

U.S. PATENT DOCUMENTS 5,901,720 A    5/1999   Lange
6,000,484 A   12/1999   Zoretich
(Continued)

FOREIGN PATENT DOCUMENTS

WO      9322063 A1   11/1993
WO   2018222057 A2   12/2018

OTHER PUBLICATIONS

International Search Report for PCT International Application No. PCT/BR2019/050565, dated Feb. 28, 2020.

*Primary Examiner* — Yewebdar T Tadesse
(74) *Attorney, Agent, or Firm* — Raphael Bellum PLLC

(57) ABSTRACT

The present invention refers to an automated painting system on oil ships, being executed by a mobile platform and an oscillating arm. The assembly only works due to the control of cables, winders and wheels. This approach is aimed at painting large vertical walls. The painting deck suspension uses four cables, each connected to a pivot on the (Continued)

mobile platform, and two fixed pivots plus four winders. The winders contain a servo motor in a synchronous serial network. The cables are made of reduced-weight polyethylene. Each cable is connected exclusively to one winder. Suspension is achieved with the aid of two adapted cranes and initialization through the addition of a giraffe-type crane.

8 Claims, 4 Drawing Sheets

(51) Int. Cl.
    *B25J 5/02*     (2006.01)
    *B25J 11/00*     (2006.01)

(56) References Cited

U.S. PATENT DOCUMENTS

| | | | |
|---|---|---|---|
| 6,566,834 B1 * | 5/2003 | Albus | B25J 9/1623 |
| | | | 318/566 |
| 6,826,452 B1 | 11/2004 | Holland | |
| 2018/0169685 A1 | 6/2018 | Taylor | |

* cited by examiner

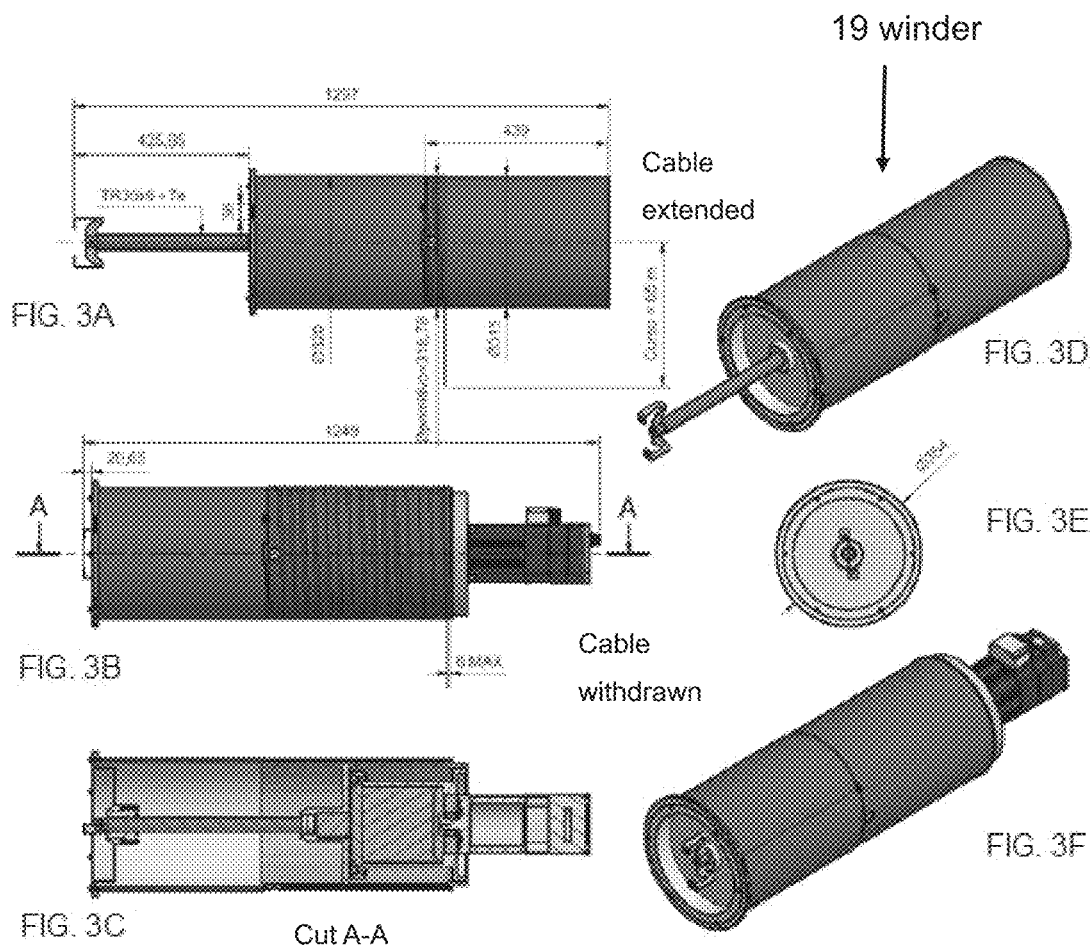
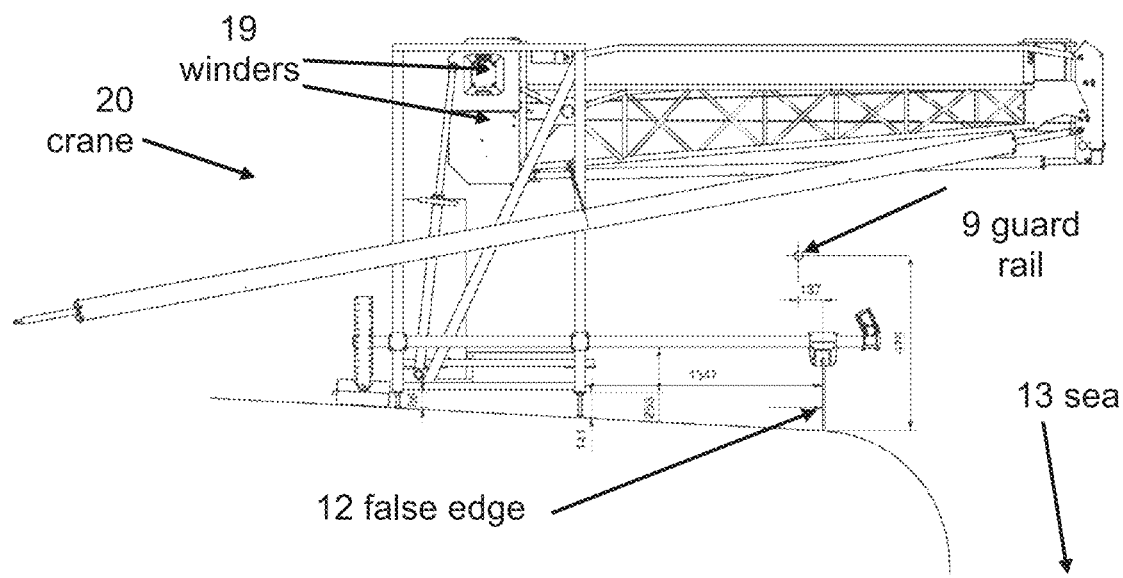
FIG. 4

CABLE ROBOT FOR COATING PROCEDURES

FIELD OF THE INVENTION

The present invention refers to technologies for ship and oil platform equipment, in addition to building maintenance. More specifically, the present invention refers to robot-automated painting technology.

BACKGROUND OF THE INVENTION

The state-of-the-art on painting vertical surfaces, regardless of the manner in which painting is done, uses devices which, in general, follow the same principles of traction and suspension using cables.

Usually, two motorized cables pull the devices, using counterweights to balance the weight of the suspended system; there are numerous publications in the field. Author and inventor Patricio Gonzalez Vivo developed a painting device suspended by two cables, each cable being pulled by motors located on the sides of the upper portion of the system. The cables use counterweights when passing through the motors. The revealed device is controlled via software through scripts, and allows images to be drawn on a vertical wall where the device is suspended. The device is moved by direct traction of the cables. His work was published on the internet on his own page, with videos and construction details. The author called his invention VPlotter.

The invention, entitled ARDUINO XY PLOTTER DRAWING ROBOT, reveals a painting device suspended by two cables, each cable being pulled by a motor located on an upper lateral portion of the system. The revealed device is controlled by software that allows an image to be drawn on the vertical surface on which the device is suspended. The suspended device is moved by pulling the cables that support it, also using counterweights.

The invention, entitled Hektor Spray Robot, available and published on the internet, reveals a painting device suspended by two cables, each cable being pulled by a motor located on an upper side portion of the system. The revealed device is controlled by software that allows an image to be drawn by spray painting on the vertical surface on which the device is suspended. The suspended device is moved by pulling the cables that support it using counterweights.

Such developments, therefore, are applied to small areas, generally for the production of drawings and images, and not painting or coating of large metallic surface areas.

For cases of maintenance or inspection of large vertical flat surfaces, it is done by construction access, such as scaffolding or climbing harnesses. In order to paint, the employee must be able to access the location to be painted.

For shipbuilding, access is by scaffolding, as the work is carried out in dry dock. This access is financially expensive and time-consuming. Furthermore, it involves work safety risks.

There is a need to reproduce the type of painting done by an employee. This means that there are certain variables in performing the work that must be considered. One of these is the linear manner in which the painting system applies paint. The movement of an employee that is considered to be the most effective is usually rectilinear (horizontal or vertical), stopping application at the ends. Since the speed in the inversion of movement is zero at these endpoints, the painting system could overspray. To prevent overspray, the paint application gun mechanism is stopped until it returns to its normal application speed.

In current systems, whether they are the type that use belt-type cables, toothed cables, or cables with marker balls, there is still the problem of gaps that impact the system's movement.

An attempt to overcome such problems is to add two more cables to the system, which leads to a series of new factors to be considered, such as motion control, speed parameterization and acceleration.

Furthermore, if only two anchor points are used, such as in the existing systems, there is a huge risk of the device swinging and causing one of the cables to break, and one of the consequences of such a breakage is to overload the remaining anchor point, leading to the device falling.

As will be further detailed below, the present invention aims to resolve the problems of the prior art described above in a practical and efficient manner.

SUMMARY OF THE INVENTION

The approach of the present application seeks to use a mobile platform suspended by controlled cables, allowing a large surface to be covered with a lightweight modular infrastructure.

The mobile suspended platform is positioned by the cables, with its suspension system placed on free Mecanum wheels that behave like spheres.

The system basically works through cables, which keep the assembly suspended on vertical or horizontal walls, where the assembly is "affixed" to the walls by a magnetic base that is located on the wheels.

In the winding section, the proposed system contains servo motors in a synchronous serial network, ultra molecular weight polyethylene cables, magnetic bases, and a magnetic brake.

Covering large surfaces for inspection requires an automated positioning infrastructure, which is typically installed at the factory. However, in the case of ship hull construction, this type of infrastructure is so large that it becomes economically unfeasible. For these cases, therefore, something mobile is used on the element, in this case the hull.

The strategy used so that obstacles are disturbed as little as possible in the painting process is not to paint while descending, and to paint while ascending, such that the main obstacles will be faced in the process, as if descending stairs.

The movement speed must be such that it meets a minimum process speed. This minimum speed may be around 105 m$^2$ per hour.

The wheels together with the suspension system were designed to minimize coating losses during the painting process.

The main advantages of the invention of the proposed embodiment of the invention are greater agility in the application of coatings, uniformity in the applied layer, speed in the process, possibility of controlling the application speed, possibility of locating the point of application of the coating during its trajectory, controlling the torque during linear movement, possibility of varying the application angle from −45° to +45°, possibility of adjusting the gun to the surface to be coated, and possibility of adjusting the gun in relation to the center of rotation of the arm.

The coating application speed normally varies between 150 m2/h to 430 m2/h.

The invention makes it possible to dispense with constructing scaffolding over the sea surface, while having fewer workers involved and exposed to dangerous conditions. However, a small scaffold is required to install the painting platform.

The reliability of the process is greater, as it guarantees homogeneous paint thickness and repetition, in addition to preventing waste that impacts the environment.

In addition to the oil and gas industry, this technology may be used in civil construction.

BRIEF DESCRIPTION OF THE FIGURES

The detailed description presented below references the attached figures and their respective reference numbers.

FIGS. 3A to 3F show the winder detail.

FIG. 4 shows the layout of a crane, from a side view, which will be the anchoring point of the painting platform.

DETAILED DESCRIPTION OF THE INVENTION

Figure 1:
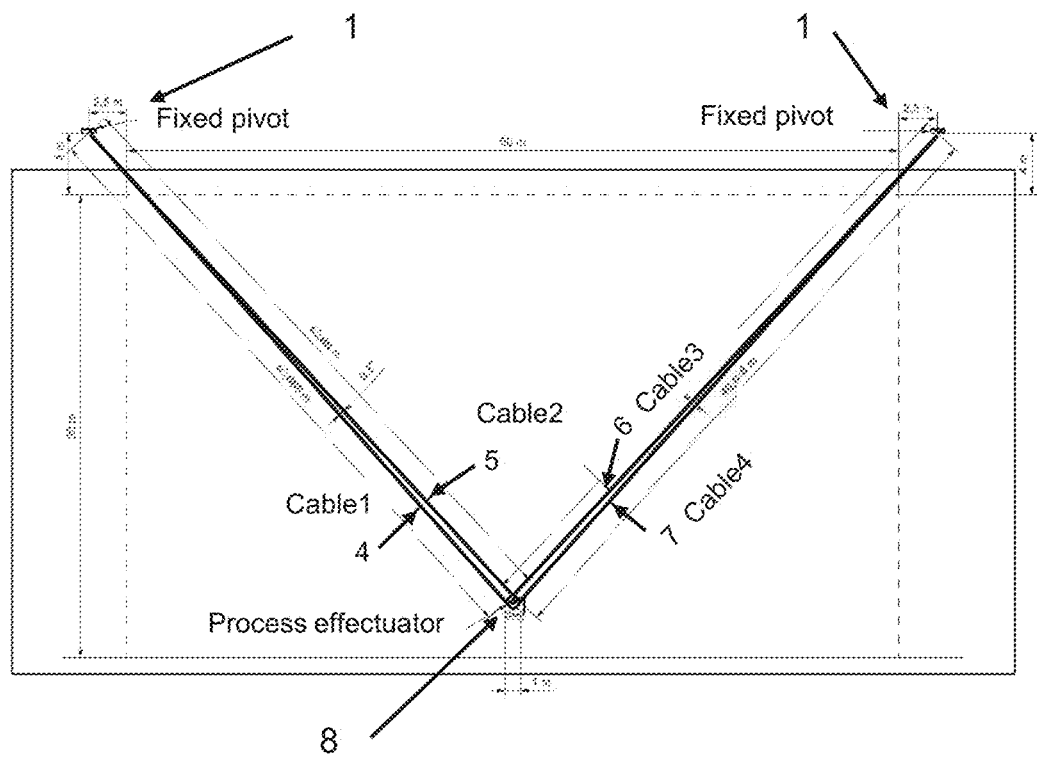
FIG. 1 shows the layout of the painting platform suspended by four cables, each cable on a winder, located on a vertical wall.
Figure 2:
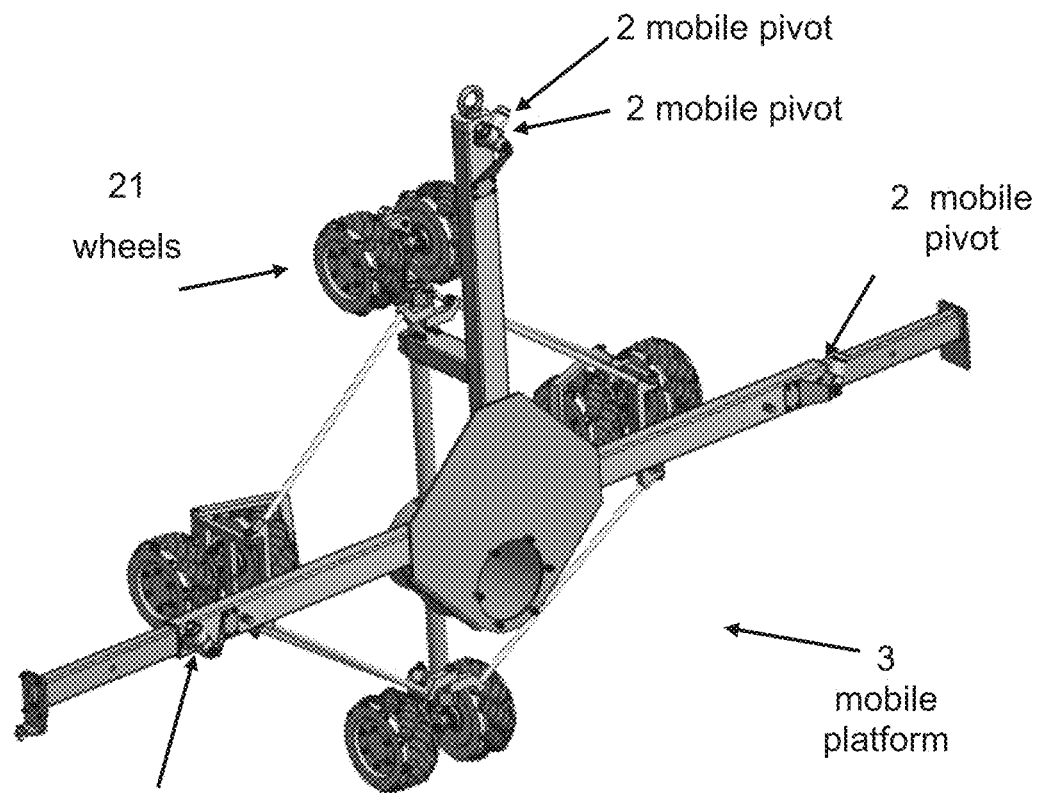
FIG. 2 shows the process effectuator, detailing the anchor points.

The purpose of the present invention is to use a type of cabling configuration to suspend a mobile platform, developed to couple an oscillating mechanism that performs the painting process, and also to move rapidly and accurately to ensure the quality of painting on ship hulls, but not being restricted to this application.

For a better understanding of the invention, we will illustrate it by means of the following description, which is a preferred embodiment of the invention. As will be apparent to anyone skilled in the art, however, the invention is not limited to that particular embodiment.

The present invention, related to the arrangement of cables for suspension of the mobile platform (3), is new because it is positioned by four cables, with its suspension system placed on free "Mecanum" wheels (21) that behave like spheres. In this case it has two fixed pivots at deck height, which will be the base of the structure that suspends the suspended mobile platform, and four mobile pivots at the ends of the mobile platform. The cables are controlled by four different winders (19) that work independently, all of which are evaluated in real-time to determine the tension on each cable, thus enabling real-time correction of the trajectory, taking into account factors such as elasticity of the cable, the friction factor of the winders, and the variation of the load on the system.

The mobile platform (3) intended to receive the oscillating mechanism must be installed by hoisting, using two cranes (20), as the assembly weighs 180 kg. In addition, the mobile platform (3) on the hull must be installed using a giraffe-type crane (14).

The mobile suspended platform (3) is positioned by the cables, with its suspension system placed on free Mecanum wheels that behave like spheres.

The principle, shown in FIG. 1, is based on the positioning of a mobile platform (3) suspended by four cables. In this case it will have two fixed pivots (1) at deck height, which will be the base of the structure that suspends the suspended mobile platform (3), and four mobile pivots (2) at the ends of the suspended mobile platform (3). This suspended mobile platform (3) will carry a coating or paint applicator arm, with a sweeping dynamic suitable for the painting process.

This suspended mobile platform and oscillating mechanism assembly (22) will be the project's process effectuator (8).

The connection of these six points, two on the hull represented by fixed pivots (1) and four on the mobile platform (3) represented by mobile pivots (2), in this case is suspended by four cables that will create three triangles with two concurrent sides. Thus the first two cables (4) and (5) come out of winders 1 and 2 concurrently at the same point projected on the 2D plane of the hull, as the two mobile pivots (2) on the suspended mobile platform (3).

The 3rd "third" (6) and 4th "fourth" cable (7) leave the concurrent point of winders 3 and 4. Cable 3 (6) reaches a concurrent point with cable 2 and the 4th "fourth" cable reaches the 3rd "third" suspension point of the suspended mobile platform (3).

The winding mechanism, FIGS. 3A to 3F, is the assembly that positions the mobile platform on the wall. The concept is a precise winder with only one layer of cable on the drum, and the axial movement of the drum pulled by a static trapezoidal spindle. FIGS. 3A to 3F show the dimension of a winder with technical details.

In addition to the single-layer winding mechanism, the winding assembly also has a load cell for measuring the force applied to the cable and compensating for the free length between the winder and the platform. This feature is necessary in this redundant kinematic solution of four cables controlling three degrees of freedom (X, Y and A). With the load measurement we will offset the deformation of the cables, as the forces vary greatly depending on the position of the platform in the work area. In the general sizing of this system, the calculated load on the cables varies from 4 N to 3,545 kN. The maximum load represents 16% of the guaranteed rupture load of the cables.

Figure 5:
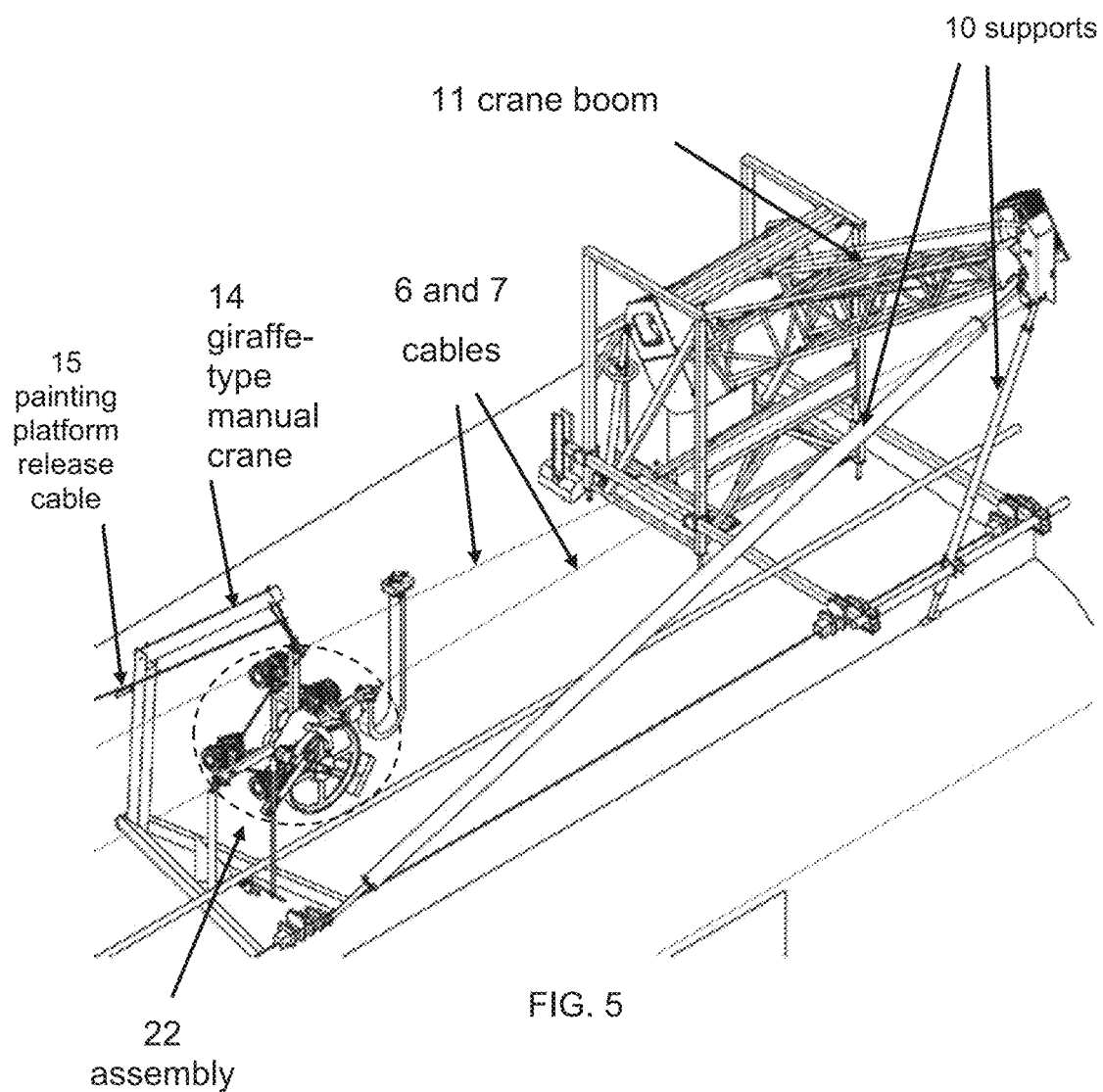
FIG. 5 shows a crane, a giraffe crane, and the painting platform.

FIG. 4 shows a crane in side view, serving as a pivot point for 2 cables. The lifting mechanism for the cable robot is an assembly comprising a crane, with two additional supports (10), one aligned with the crane boom (11), and the other tilted to the side of the robot cables, as shown in FIG. 5. In this case, work is done in compression so that the robot can be installed even close to side obstacles with the housing and the bases of the cranes on the platform. The crane has a base framework with wheels for transport across the deck to the installation point, threaded feet for support directly to the floor, lifting the wheels from contact with the ground. The crane boom (11) uses the cable winders (winches) as a counterweight, so it applies its weight to the pivot of the crane's base framework. The base framework has an integrated control panel that acts as ballast on the opposite side of the crane's pivot, so as to bring the center of gravity over the area between the wheels.

With the crane assembly pre-assembled according to the arrangement indicated in FIG. 4, the assembly must be positioned, still using the wheels until it is close to the guardrail (9) on the side. Care must be taken to smoothly stop the assembly as the center of gravity of this configuration is high and forward, almost over the wheels under the boom. This causes the assembly to topple over easily. If this assembly is released and bumps against the false edge (12), it will likely topple over the guardrail (9) and fall towards the sea (13).

To launch the assembly (22) of the mobile platform and the oscillating mechanism from the deck to the side of the platform, a giraffe-type manual crane (14) must be used, as the assembly has a mass of 180 kg, being hoisted by the painting platform release cable (15).

Due to the risk of working with this type of force close to the guardrail, and due to the fact that the entire length of the side is not covered by cranes on the platform, especially in the area chosen for testing, where the crane does not reach, the launch procedure must be done using the robot's own winders. In order to have the capacity to hoist the winders for the launch, the launch must be done close to one of the cranes (20), normally 5.5 m and far away from each other. FIG. 5 shows this distance close to one of the cranes.

Figure 6:
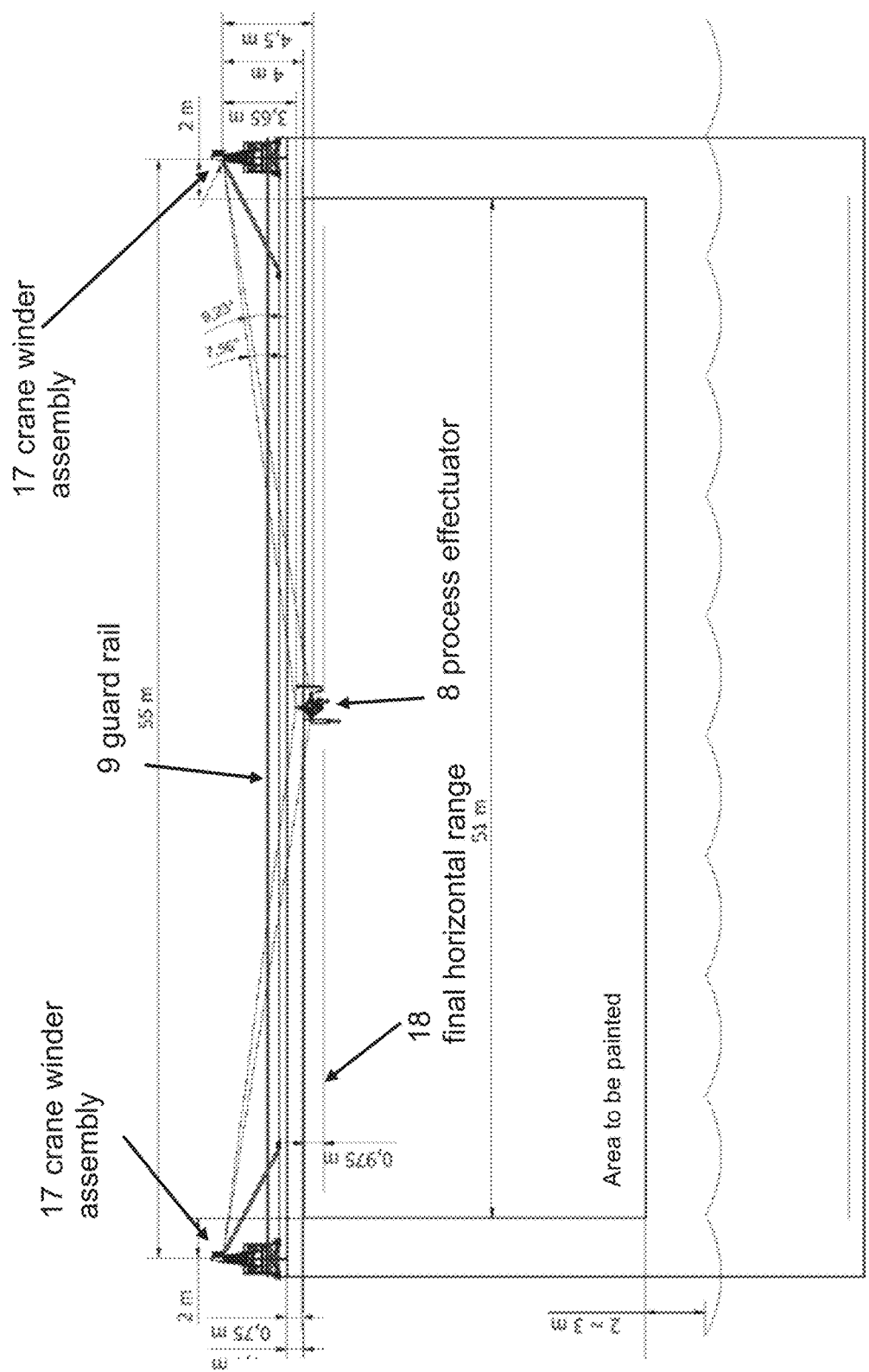
FIG. 6 shows the painting platform suspended by the two cranes, and the effective painting area.

FIG. 6 shows the crane-winder assembly (17) on both the left and right sides in operation. Also shown is the threshold of the vertical paint range and the final horizontal range (18). As an example, the effective painting area is shown, in this case 17×51 m².

Please be advised that the use of the cable system, cranes and winders is not restricted to the embodiment shown here, as they can be used in any application.

The invention claimed is:

1. A cable robot used in a coating process, the cable robot comprising:
   two fixed pivots;
   four movable pivots;
   four cables;
   four winders;
   a process effectuator or mobile platform for carrying a coating or paint applicator arm and oscillating mechanism assembly,
   two cranes; and
   an electronic control unit,
   wherein the four cables comprise a reduced-weight polyethylene material, with the four cables connected two-by-two to each of the fixed pivots that are at deck height on a ship, and the four cables suspend the mobile platform connected to the moveable pivots.

2. The cable robot of claim 1, wherein the mobile platform is moved by the four winders that act on the four cables through the electronic control unit.

3. The cable robot of claim 1, wherein each of the winders includes a load cell for measuring force applied to at least one of the four cables and a compensation of a free length between each of the winders and the mobile platform, and also each of the winders includes a servo motor in a synchronous serial network.

4. The cable robot of claim 1, wherein the mobile platform is initially positioned by an additional crane and the two cranes.

5. A cable robot used in a coating process, the cable robot comprising:
   two fixed pivots;
   four movable pivots;
   four cables;
   four winders;
   a process effectuator or mobile platform for carrying a coating or paint applicator arm and oscillating mechanism assembly,
   two cranes; and
   an electronic control unit,
   wherein the four winders are installed on the two cranes, and the two cranes include two supports, wherein one of the supports is aligned with a crane boom and the other one of the supports is tilted to a side of the four cables.

6. The cable robot of claim 5, wherein the mobile platform is moved by the four winders that act on the four cables through the electronic control unit.

7. The cable robot of claim 5, wherein each of the winders includes a load cell for measuring force applied to at least one of the four cables and a compensation of a free length between each of the winders and the mobile platform, and also each of the winders includes a servo motor in a synchronous serial network.

8. The cable robot of claim 5, wherein the mobile platform is initially positioned by an additional crane and the two cranes.

* * * * *